United States Patent
Knoche et al.

(10) Patent No.: US 6,782,642 B2
(45) Date of Patent: Aug. 31, 2004

(54) LIGHT RUNNING SHOE

(75) Inventors: Bernhard Knoche, Nuremberg (DE);
Klaus Knoerr, Langensendelbach (DE);
Gerald Kuhtz, Nuremberg (DE)

(73) Assignee: adidas International, Amsterdam (NL)

( * ) Notice: Subject to any disclaimer, the term of this patent is extended or adjusted under 35 U.S.C. 154(b) by 0 days.

(21) Appl. No.: 09/920,439

(22) Filed: Aug. 1, 2001

(65) Prior Publication Data

US 2002/0035796 A1 Mar. 28, 2002

(30) Foreign Application Priority Data

Aug. 2, 2000 (DE) .......................................... 100 37 728

(51) Int. Cl.$^7$ ................................................. A43B 5/00
(52) U.S. Cl. .......................................... 36/129; 36/59 C
(58) Field of Search ............................. 36/59 R, 59 C, 36/129

(56) References Cited

U.S. PATENT DOCUMENTS

| | | | | |
|---|---|---|---|---|
| 12,219 | A | * 1/1855 | Foster ........................... | 228/50 |
| 692,397 | A | * 2/1902 | Wilkinson .................... | 428/223 |
| 1,124,062 | A | * 1/1915 | Robinson ..................... | 36/71.5 |
| 1,383,793 | A | * 7/1921 | Eckel ........................... | 442/250 |
| 2,333,303 | A | * 11/1943 | Enos ............................ | 36/25 R |
| 2,349,975 | A | * 5/1944 | Mackenzie .................... | 428/94 |
| 2,364,134 | A | * 12/1944 | Dow et al. ..................... | 428/94 |
| 2,400,487 | A | * 5/1946 | Clark ............................ | 428/89 |
| 2,557,946 | A | * 6/1951 | Crooker ....................... | 36/32 R |
| 3,190,016 | A | | 6/1965 | Hansjosten .................... | 36/2.5 |
| 3,555,697 | A | * 1/1971 | Dassler .......................... | 36/129 |
| 4,245,406 | A | | 1/1981 | Landay et al. .................. | 36/14 |
| 4,297,796 | A | | 11/1981 | Stirtz et al. ..................... | 36/28 |
| 4,407,034 | A | | 10/1983 | Ralphs ........................... | 12/142 |
| 4,876,053 | A | | 10/1989 | Norton et al. ................... | 264/255 |
| 4,899,465 | A | | 2/1990 | Bleimhofer et al. ............. | 36/14 |
| 5,193,240 | A | | 3/1993 | Salpietro ........................ | 12/146 |
| 5,237,758 | A | * 8/1993 | Zachman ....................... | 36/32 R |
| 5,396,675 | A | | 3/1995 | Vincent et al. ................. | 12/142 |
| 5,477,577 | A | | 12/1995 | Hadley .......................... | 12/142 |
| 5,628,127 | A | | 5/1997 | Nötzold ......................... | 36/14 |
| 5,732,480 | A | | 3/1998 | Nötzold ......................... | 36/14 |
| 6,032,388 | A | | 3/2000 | Fram ............................. | 36/129 |
| 2001/0045028 | A1 | | 11/2001 | Crane et al. .................... | 36/44 |

FOREIGN PATENT DOCUMENTS

| | | | |
|---|---|---|---|
| DE | 3021129 C2 | 2/1981 | .......... A43B/5/00 |
| EP | 0111084 | 6/1984 | .......... A43B/5/00 |
| EP | 0161136 | 3/1987 | .......... B29C/45/14 |
| EP | 0387268 | 5/1989 | .......... A43B/7/14 |
| EP | 0353430 | 2/1990 | .......... A43B/5/08 |
| EP | 0389752 | 10/1990 | .......... A43B/5/02 |
| EP | 0320993 | 11/1990 | .......... A43B/21/26 |
| EP | 0395538 | 6/1991 | .......... A43B/3/18 |
| EP | 0458174 A1 | 11/1991 | .......... A43B/13/12 |
| WO | WO 89/04125 | 5/1989 | .......... A43B/7/14 |
| WO | WO 89/05593 | 6/1989 | .......... A43B/21/26 |
| WO | WO 94/13164 | 6/1994 | .......... A43B/13/00 |
| WO | WO 98/39984 | 9/1998 | .......... A43B/13/18 |

OTHER PUBLICATIONS

Photograph of ASIC® show with a thermoplastic urethane grid affixed with glue to a conventional outsole in a rear foot portion of the shoe.

* cited by examiner

*Primary Examiner*—M. D. Patterson
(74) *Attorney, Agent, or Firm*—Testa, Hurwitz & Thibeault, LLP (57) ABSTRACT

The present invention relates to a sole for an article of footwear and the method of manufacture. The sole includes a mesh layer at least partially embedded in a sole layer. The method for manufacturing the sole includes the steps of providing a mold, inserting a mesh into the mold, and forming a sole layer in the mold, the sole layer having a mesh layer at least partially embedded in the sole layer. The invention also relates to an article of footwear that includes this sole, and the method of manufacture thereof.

28 Claims, 7 Drawing Sheets

LIGHT RUNNING SHOE

RELATED APPLICATION

This application claims the benefit of and priority to copending German Patent Application No. 10037728.9, filed at the German Patent Office on Aug. 2, 2000, entitled "Light Running Shoe," the entire disclosure of which is hereby incorporated herein by reference.

TECHNICAL FIELD

The invention generally relates to a light weight sole, article of footwear, and method of manufacture. More specifically, the invention relates to a sole and article of footwear having a mesh layer at least partially embedded in a sole layer, and methods of manufacture.

BACKGROUND

Soles of conventional athletic shoes such as running shoes, are characterized by layered structures which typically consist of an outer sole, a mid sole, and an inner sole. The outer sole conventionally consists of a non-abrasive, low-elastic material or rubber which is characterized by a relatively high density and therefore also by a relatively high weight. The outer sole significantly contributes to the weight of the shoe, which causes the wearer to tire quickly, especially in competition situations. The conventionally used mid sole also contributes significantly to the weight of the sole and the resulting shoe.

SUMMARY OF THE INVENTION

The sole and article of footwear of the present invention overcome the problem of high weight in known soles and articles of footwear. The invention generally relates to a light weight sole that avoids the use of a conventional, heavy outsole, without sacrificing traction and damping. Since conventional outsoles have a relatively high weight, the total weight of the sole is significantly reduced. According to the invention, the sole is constructed from a light weight rigid or semi-rigid polymeric layer having a mesh or fibers at least partially embedded in the layer. The mesh can be substantially embedded or coterminous with the polymeric sole layer. The mesh provides traction for the wearer and abrasion resistance for the sole. Profile depressions can be formed in the sole layer to further provide traction for the wearer.

In one aspect, the invention relates to a sole for an article of footwear. The sole includes a sole layer and a mesh layer at least partially embedded in the sole layer. The mesh layer can have a contoured surface including a knit structure formed from one or more threads. The one or more threads van include spun fibers. The threads can be constructed from one or more metals, polyesters, polyamides, aramids, and combinations of these materials. The mesh layer can extend beyond a bottom ground engaging surface of the sole layer or can be substantially coterminous with the bottom surface of the sole layer. The sole layer can include one or more profile grooves defined by the bottom surface of the sole layer. The sole layer can include a damping material including ethylene vinyl acetate, polyurethane, rubber, and combinations of these materials.

In another aspect, the invention relates to an article of footwear. The article of footwear includes an upper, a sole layer attached to the upper, and a mesh layer at least partially embedded in the sole layer. The mesh layer can have a contoured surface including a knit structure formed from one or more threads. The one or more threads can include spun fibers. The threads can be constructed from one or more metals, polyesters, polyamides, aramids, and combinations of these materials.

In various embodiments, the mesh layer can extend beyond a bottom pound engaging surface of the sole layer or can be substantially coterminous with the bottom surface of the sole layer. The sole layer can include one or more profile grooves defined by the bottom surface of the sole layer. The sole layer can include a damping material including ethylene vinyl acetate, polyurethane, rubber, and combinations of these materials.

In yet another aspect, the invention relates to a method for manufacturing a sole for an article of footwear. The method includes the steps of providing a mold, inserting a mesh into the mold, and forming a sole layer in the mold, the sole layer having the mesh layer at least partially embedded in the sole layer. The method can include the step of mounting the mesh to an inner surface of the mold. The mold can have an inner surface structure complementary to that of the mesh. Alternatively or additionally, the inner surface structure can form one or more profile grooves in the bottom surface of the sole layer formed therein. The sole layer can be formed so that the mesh extends beyond a bottom surface of the sole layer or is substantially conterminous with the bottom surface of the sole layer. The sole layer can be formed by injection molding, compression molding, or other suitable method.

In still yet another aspect, the invention relates to a method for manufacturing an article of footwear. The method includes the steps of providing a mold, inserting a mesh into the mold, and forming a sole layer in the mold, the sole layer having the mesh layer at least partially embedded in the sole layer. The method also includes attaching an upper to the sole layer. The method can include the step of applying the mesh to an inner surface of the mold. The mold can have an inner surface structure complementary to that of the mesh. Alternatively or additionally, the inner surface structure cam form one or more profile grooves in the bottom surface of the sole layer formed therein. The sale layer can be formed so that the mesh extends beyond a bottom surface of the sole layer or is substantially coterminous with the bottom surface of the sole layer. The sole layer can be formed by injection molding, compression molding, or other suitable method.

These and other objects, along with advantages and features of the present invention herein disclosed, will become apparent through reference to the following description, the accompanying drawings, and the claims. Furthermore, it is to be understood that the features of the various embodiments described herein are exemplary only, are not mutually exclusive, and can exist in various combinations and permutations.

BRIEF DESCRIPTION OF THE DRAWINGS

The drawings are not necessarily to scale, emphasis instead generally being placed upon illustrating the principles of the invention. In the following description, various embodiments of the present invention are described with reference to the following drawings, in which.

DESCRIPTION

When shoes are designed and constructed, in particular athletic shoes such as running shoes, importance is attached to the weight of the shoe. The weight is determined by the type and the quantity of the materials used. Especially in the case of running shoes which are used for competitions, there is the objective to provide a shoe which is as light as possible but which, at the same time, maintains its essential properties. Examples of such properties are good traction and damping from the sole, as well as precise fit and support of the foot by the upper.

The invention avoids the use of a conventional, heavy outsole, without sacrificing traction and damping. Since conventional outsoles have a relatively high weight, the total weight of the sole is significantly reduced. According to the invention, the sole is constructed from a light weight cushioning layer having a light weight mesh at least partially embedded in the layer that provides traction for the wearer and abrasion resistance for the sole.

Figure 1A:
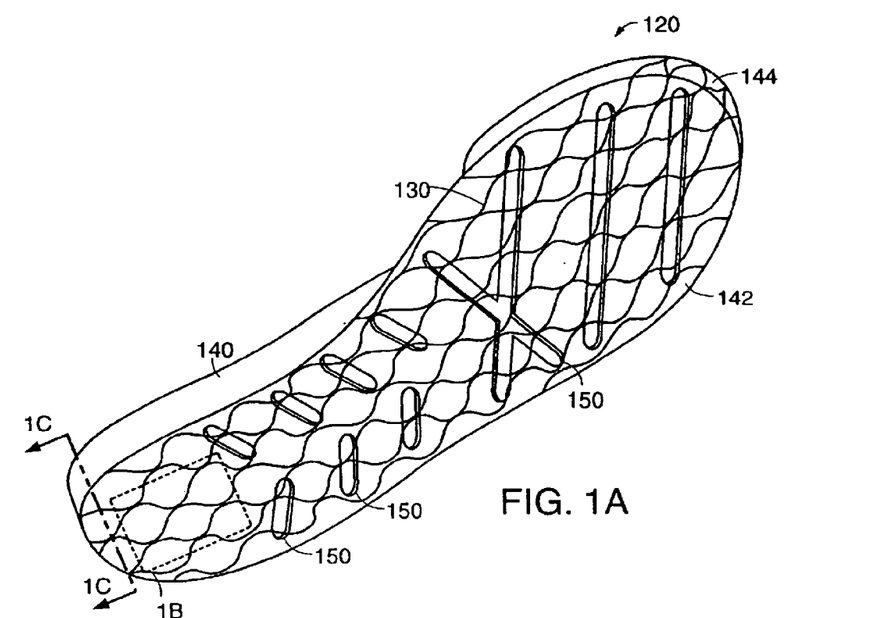
FIG. 1A is a schematic perspective view of a bottom and side of a sole in accordance with the present invention.
Figure 1B:
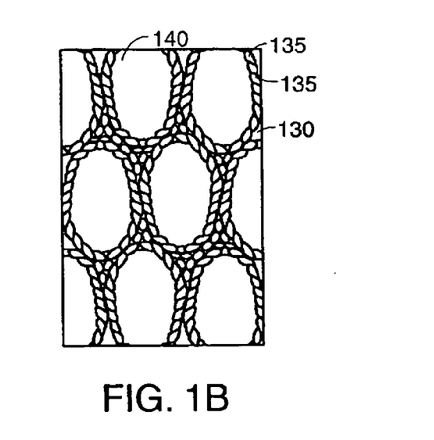
FIG. 1B is a schematic enlarged view of a portion of the sole of FIG. 1A taken at B.
Figure 1C:
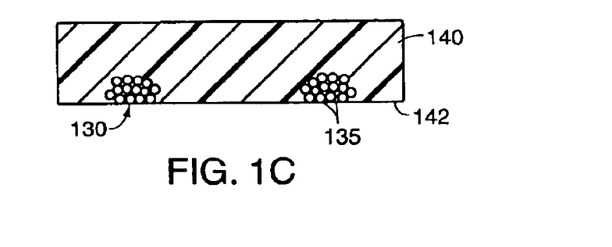
FIG. 1C is a schematic cross-sectional view of the sole of FIG. 1A taken at line C—C.

FIGS. 1A–1C depict one embodiment of a sole 120 constructed in accordance with the present invention. The sole 120 generally includes a mesh 130 embedded in a bottom, ground engaging sole layer 140. The mesh 130 extends along and is substantially coterminous with a bottom surface 142 and, optionally, a front surface 144 of the sole layer 140. Also shown are a plurality of profile grooves 150 defined by the bottom surface 142 of the sole layer 140 to further improve traction.

Referring to FIGS. 1B–1C, the mesh 130 has a contoured surface in that it is formed by individual threads 135 that are woven together as opposed to, for example, a flat grid-like structure. The threads 135 are spun from fibers of one or more different materials and then are woven into a contoured knit structure, yarn, or fabric to form the mesh 130. The mesh 130 also can be formed by various methods other than knitting or weaving, for example, by shaping or molding polymeric and/or other materials, to form a contoured or non-planar surface. The threads 135 also can be formed from fibers other than by spinning or weaving, for example, by heat-welding, adhesion, or coextrusion. The mesh 130 also can be constructed directly from fibers, for example, by knitting, weaving, adhering, coextruding, or heat-welding. The mesh 130 extends substantially across the bottom surface 142 and the front surface 144 of the sole layer 140.

Optionally, however, the mesh can extend over only portions of the bottom surface 142, for example, the area about the heel and/or over the side of the sole layer 140.

The mesh 130 is constructed from light weight materials having relatively good abrasion and grip properties. The mesh 130 and the threads 135 can be constructed from polymers, rubber, metals, or combinations of these or other like materials. Suitable polymers include polyesters, polyamides and aramids, for example, poly-paraphenylene terephthalamide. Suitable aramids include KEVLAR® poly-paraphenylene terephthalamide fiber sold by DuPont (France), and TWARON® aramid fibers sold by Akzo Nobel GmbH (Germany). Other suitable polymeric materials include: polyurethanes, such as a thermoplastic polyurethane (TPU); ethylene vinyl acetate (EVA); thermoplastic polyether block amides, such as the PEBAX® brand sold by Elf Atochem; thermoplastic polyester elastomers, such as the HYTREL® brand sold by DuPont; nylons, such as nylon 12 that may include 10 to 30 percent or more glass fiber reinforcement; silicones; polyethylenes; and equivalent materials. The above polymeric materials can be used in combination with other materials, such as rubber or metal. Other suitable materials will be apparent to those skilled in the art.

The sole layer 140 is constructed from conventional mid-sole materials that are relatively light weight, have relatively good damping properties, and are compliant, yet resilient. Shocks induced by the natural running motion are dampened preferably by the sole layer 140 so that the joints and the muscles of the wearer of the shoe are protected, particularly while running. Suitable damping materials include aerated materials or foams, such as ethylene vinyl acetate (EVA) foam, polyurethane (PU) foam, foam rubber, and combinations of these materials. The sole layer 140 can also be formed using the energy management system described in German Patent No. 19 914 472 and U.S. Pat. No. 4,297,796, incorporated herein by reference. Furthermore, different damping elements known from the prior art can be combined with the sole layer 140 or used in addition to the sole layer 140, such as gel air cushions, padded inserts or an insole.

One or more profile or flex grooves 150 can be included in the sole layer 140 to further improve traction and impart flexibility to the sole 120. The sole layer 140 also can include profile ridges or other known protruding features to improve traction. Traction also can be improved by combining a mesh 130 that is substantially coterminous with the sole layer 140, as described above in connection with FIGS. 1A–1C, with a mesh that extends beyond the bottom ground engaging surface 142 of the sole layer 140, as described below in connection with FIGS. 2A–2B.

Figure 2A:
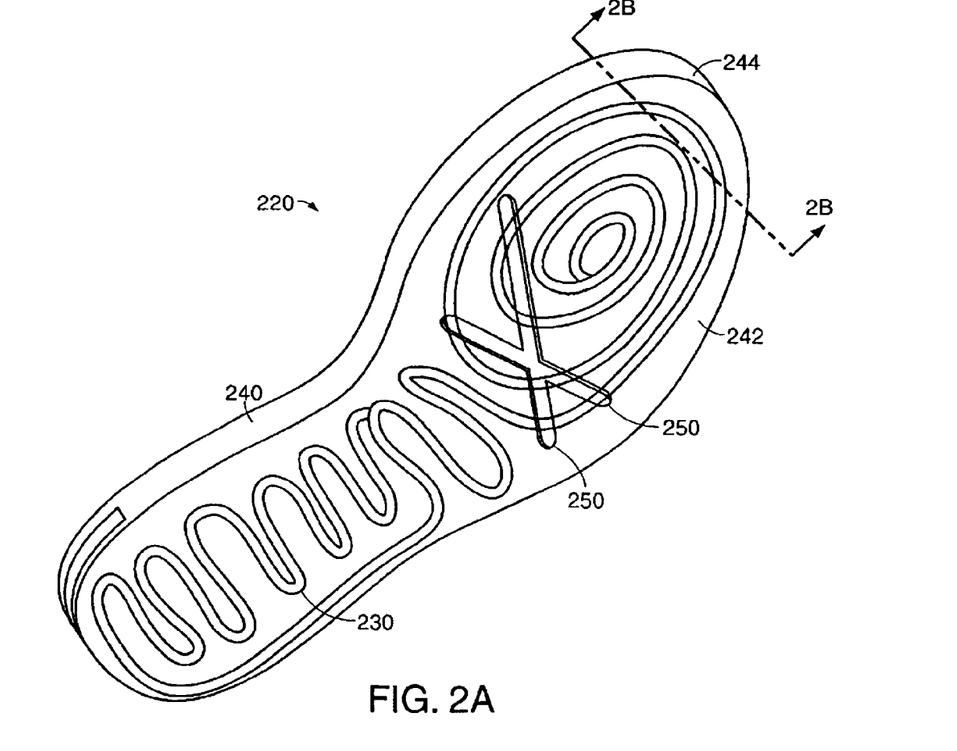
FIG. 2A is a schematic perspective view of the bottom and side of another sole in accordance with the present invention.
Figure 2B:
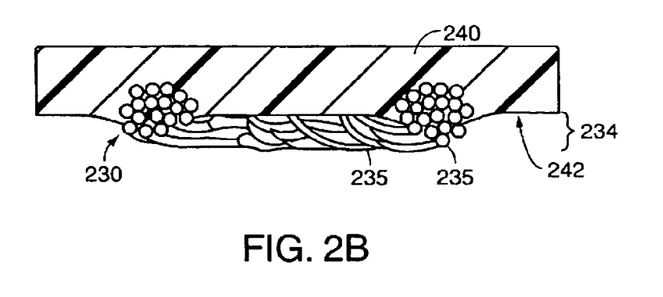
FIG. 2B is a schematic cross-sectional view of the sole of FIG. 2A taken along line B—B.

FIGS. 2A–2B depict another exemplary embodiment of a sole 220 that generally includes a mesh 230 and a sole layer 240. Also shown are profile grooves 250 defined by a bottom surface 242 of the sole layer 240. As shown in FIG. 2B, the mesh 230 is partially embedded in the sole layer 240 and extends beyond the bottom surface 242 of the sole layer 240. The mesh 230 is formed from individual threads 235 that are twisted and spun about each other and shaped into a pattern that varies across the bottom surface 242 of the sole 240.

The mesh 230 and the sole 240 can be constructed from any of the materials and using any of the methods described above in connection with FIGS. 1A–1C. The mesh 230 may be constructed from materials characterized by abrasion resistance, good grip and traction, and low weight, so that projecting portions 234 form a profile on the bottom surface 242 of the sole 220 to provide traction with the ground when in use by a wearer. This also can increase the useful lifetime of the sole 220 because the mesh 230 can be constructed from materials that are abrasion resistant. The mesh 230 contributes to the low weight of the sole 220, which lessens fatigue caused by the weight of a shoe incorporating the sole 220 when used, for example, while running.

The mesh 230 can cover all or portions of the bottom surface 242, front surface 244 or side surface of the sole 220 and be combined with a mesh that is coterminous with the bottom surface 242 of the sole layer 240. The sole 220 can optionally contain either no profile elements or a variety of profile elements that can be raised or grooved. The soles of the present invention can also include an additional sole layer, and the mesh can be embedded in this additional layer instead of the cushioning sole layer.

Figure 3A:
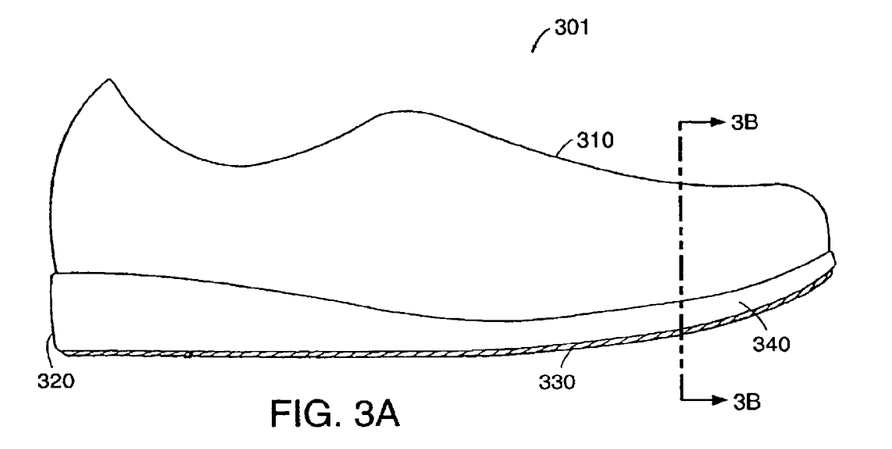
FIG. 3A is a schematic side view of an article of footwear in accordance with the present invention.
Figure 3B:
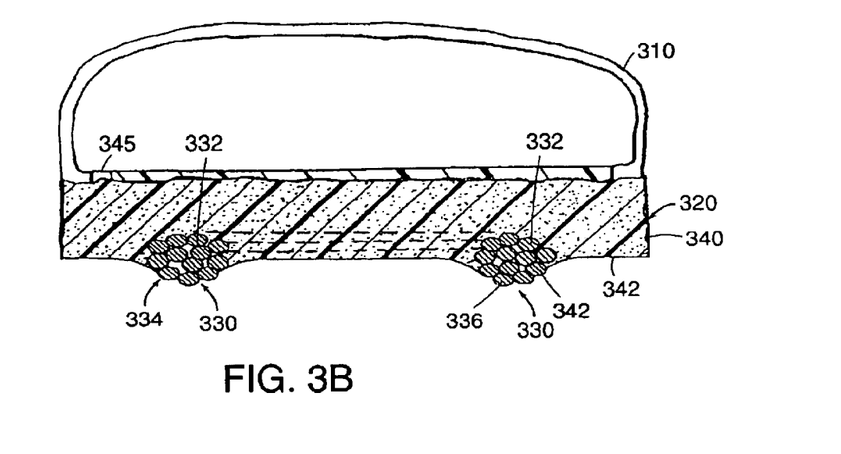
FIG. 3B is a schematic cross-sectional view of the article of footwear of FIG. 3A taken along line B—B.

FIGS. 3A–3B depict an embodiment of an article of footwear or shoe 301 that generally includes an upper 310 attached to a sole 320 that includes a mesh 330 partially embedded in a sole layer 340. As shown in FIG. 3B, the mesh 330 includes embedded portions 332 that are embedded in the sole layer 340, and projecting portions 334 that project from the sole layer 340. The mesh 330 is attached to the sole layer 340 by the embedded portions 332. The projecting portions 334 provide traction during use and resist abrasion of the sole layer 340. The shoe 301 optionally can include an insole 345 and/or a mid sole (not shown).

The mesh 330 and the sole layer 340 can be constructed from any of the mesh and sole layer materials described above. The mesh 330 may be constructed from materials characterized by abrasion resistance, good grip, and low weight, so that the projecting portions 334 of the mesh 330 form a profile on the bottom surface 342 of the sole 320 to provide traction with the ground when in use by a wearer. This also can increase the useful lifetime of the sole 320, because the mesh 330 is abrasion resistant. The mesh 330 contributes to the low weight of shoe 301, which lessens fatigue caused by the weight of the shoe 301 when used, for example, while running.

The profile or configuration of the ground engaging bottom surface 342 of the sole 320 can be varied by the size and the shape of the mesh 330. Different profiles also can be realized by varying the kind of spinning used to form the mesh 330, for example, by varying the number and arrangement of burls in the knit and by varying the strength of the knit fabrics. The profile also can be varied by including profile elements such as ridges or grooves.

The mesh 330 has a non-planar or contoured protruding surface, and is formed by individual fibers 336 that are woven, spun, heat-melded, glued or otherwise attached together, as opposed to, for example, a flat grid-like structure. The mesh 330 can be constructed from knit or woven threads spun from fibers of one or more different materials or constructed from fibers directly. The mesh also can be formed without threads or fibers, for example, by shaping, extruding, gluing, heat-welding or molding polymers, rubber, and/or metals to form the contoured, non-planar surface.

The upper 310 serves for the accommodation and support of the foot. Conventional materials, construction, and fabrics can be used for the upper 310 to ensure a precise fit. The upper 310 can consist of light natural or synthetic fibers that are perforated or comprise a loose weave or net for breathability. The upper also can include supporting elements, such as heel supporting elements. The upper 310 can be attached to the sole 320 by conventional methods, for example, by stitching, stapling, tacking, and/or adhesive.

Figure 4A:
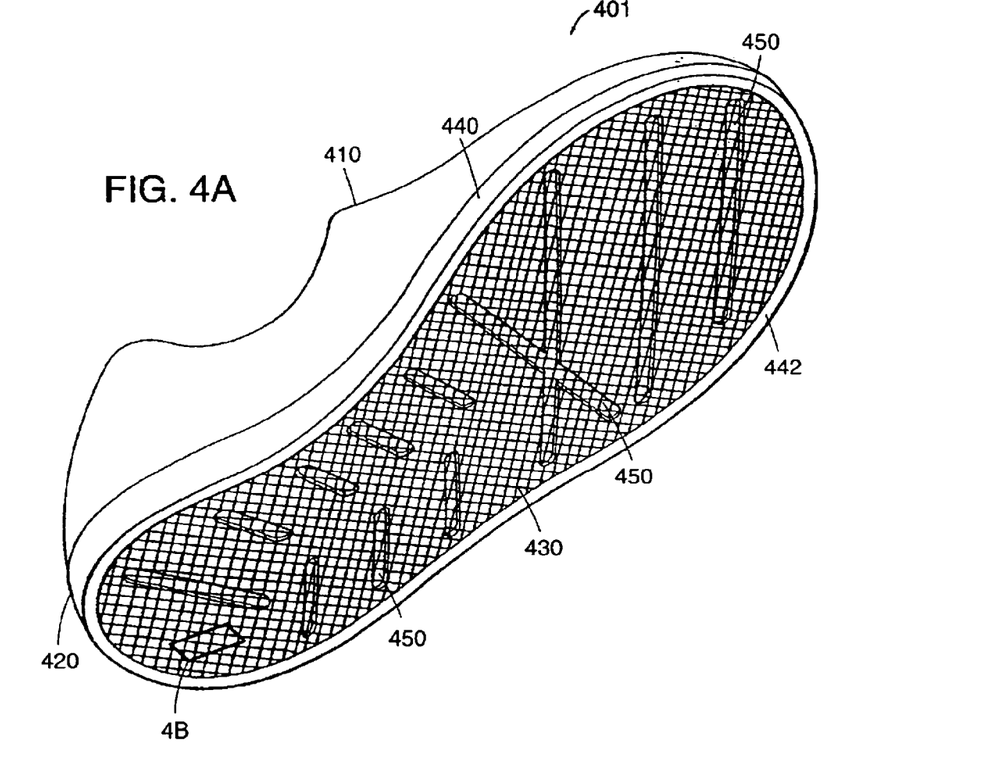
FIGS. 4A–4B are a schematic perspective view and a partial enlarged view of another article of footwear in accordance with the present invention.
Figure 4B:
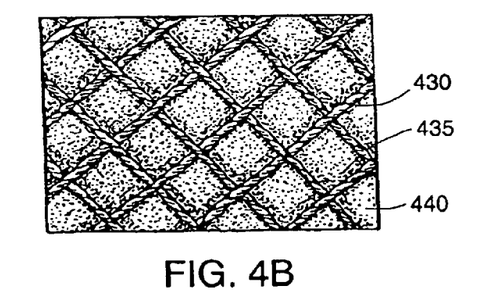

FIGS. 4A–4B depict another embodiment of an article of footwear or shoe 401 in accordance with the present invention. The shoe 401 generally includes an upper 410 attached to a sole 420 that includes a mesh 430 embedded in a sole layer 440. The mesh 430 extends along and is substantially coterminous with a bottom surface 442 of the sole layer 440. Also shown are profile grooves 450 defined by the bottom surface 442 of the sole layer 440. The mesh 430 is woven from spun threads 435.

The materials and construction and alternative embodiments of the shoe 401, including the mesh 430, the sole layer 440, and the upper 410, are as described above, for example, in connection with FIGS. 1A–1C. For example, the mesh 430 can be combined with a mesh that extends from the bottom surface of the sole layer like that described in connection with FIGS. 2A–2B and FIGS. 3A–3B.

Figure 5:
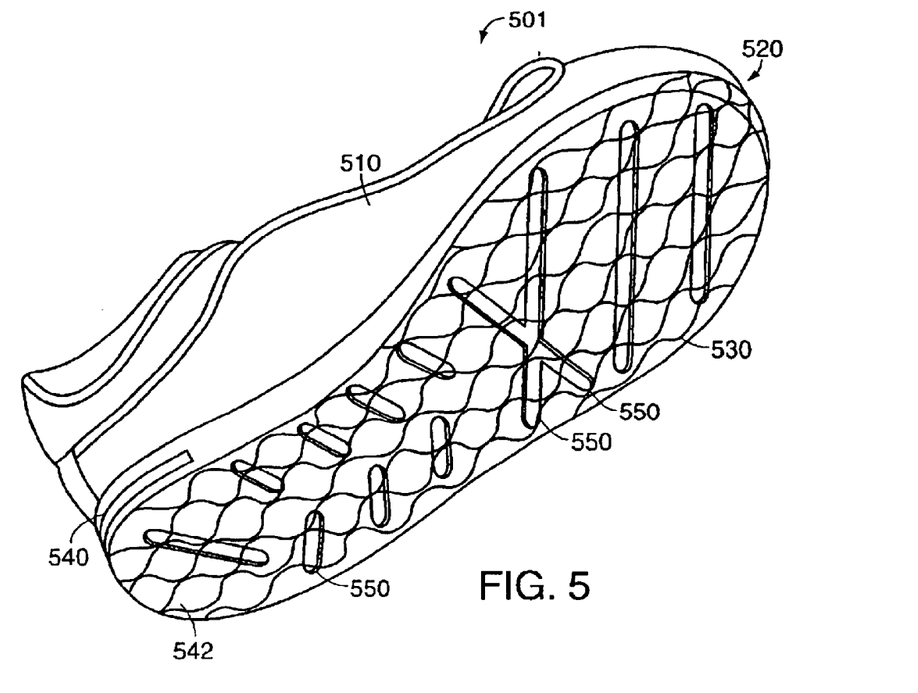
FIG. 5 is a schematic perspective view of yet another article of footwear in accordance with the present invention.

FIG. 5 depicts yet another embodiment of an article of footwear or shoe 501. The shoe 501 generally includes an upper 510 attached, to a sole 520 that includes a mesh 530 embedded in a sole layer 540. The mesh 530 extends along and is substantially coterminous with a bottom surface 542 of the sole layer 540. Also shown are profile grooves 550 defined by the bottom surface 542 of the sole layer 540. The mesh 530 is woven from spun threads 135, as described with respect to FIGS. 1A–1C. Shoe 501 avoids the use of a conventional, heavy outsole, without sacrificing good damping, abrasion resistance, and traction properties.

The materials and construction and alternative embodiments of the shoe 501 including the mesh 530, the sole layer 540, and the upper 510, are as described above, for example, in connection with FIGS. 1A–1C. For example, the mesh 530 can be combined with a mesh that extends from the bottom surface of the sole layer like that described in connection with FIGS. 2A–2B and FIGS. 3A–3B.

Figure 6A:
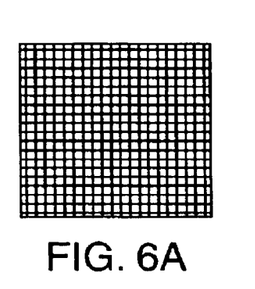
FIGS. 6A–6I are schematic views of various mesh structures in accordance with the present invention.
Figure 6B:
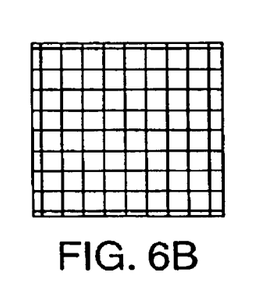
Figure 6C:
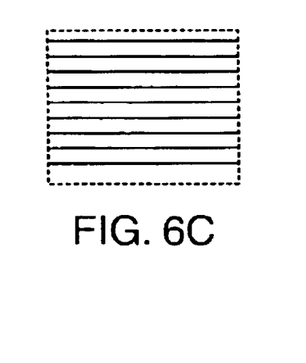
Figure 6D:
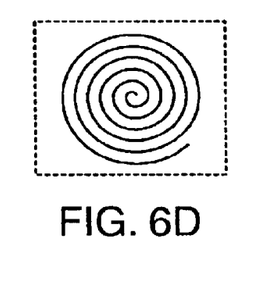
Figure 6E:
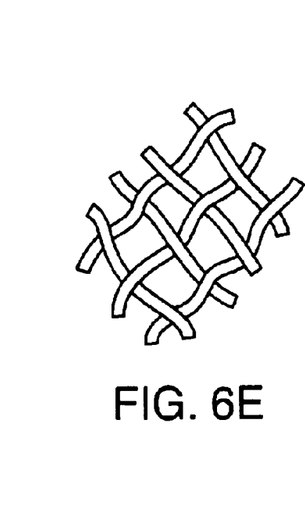
Figure 6F:
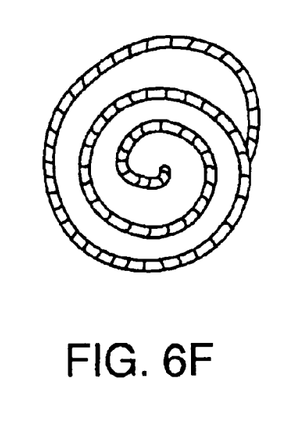
Figure 6G:
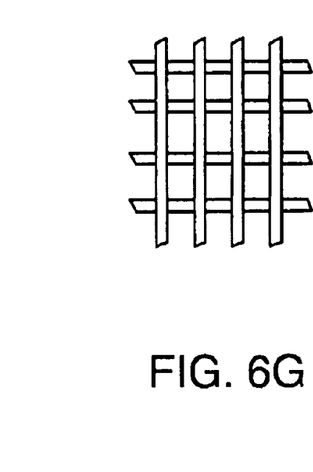
Figure 6H:
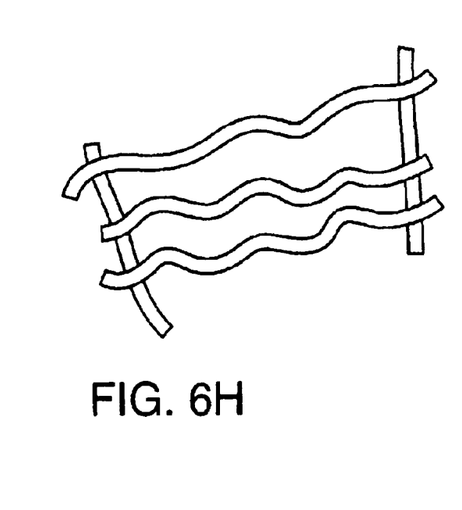
Figure 6I:
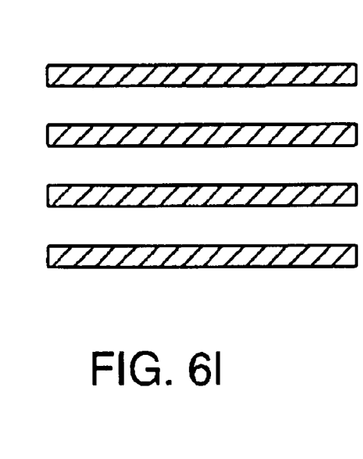

FIGS. 6A–6I depict varying mesh configurations in accordance with the present invention. FIG. 6A depicts a close knit weave. FIG. 6B depicts a loose knit weave. FIG. 6C depicts a mesh pattern having a series of substantially parallel threads. FIG. 6D depicts a generally spiral mesh. FIG. 6E depicts a loose knit weave. FIG. 6F depicts a spiral weave constructed from threads of spun fiber. FIG. 6G depicts a two layer cross-hatch. FIG. 6H depicts a wave pattern melded on its sides to two threads. FIG. 6I depicts a parallel mesh constructed from threads of spun fiber. The elements of the mesh configurations shown in FIGS. 6A–6I can be woven, glued, heat-welded or otherwise constructed. The elements also can be formed in a mold, for example, a compression or injection mold having an inner surface configured to the desired contours of the mesh. For example, the spiral configuration of FIG. 6D can be formed in this manner. The mesh can be constructed from any of the materials and using any of the methods described above. More than one mesh design can be combined to adapt different portions of the sole profile to different requirements as shown in FIGS. 2A–2B. For example, one mesh configuration or design can be used in the heel portion of the sole and another in the forefoot portion of the sole.

Another aspect of the present invention concerns methods of manufacturing a sole for an article of footwear. The method includes the steps of providing a mold, inserting a mesh into the mold, and forming a sole layer in the mold, the sole layer having smash layer at least partially embedded in the sole layer. The mold can be any type of mold, including a compression mold or an injection mold, as described below in FIG. 7 and FIG. 8. The sole, including the mesh and the sole layer, can be constructed from any of the materials and have any of the configurations described above. The mesh can be substantially coterminous and/or project from the bottom surface of the sole layer, as described above.

Figure 7:
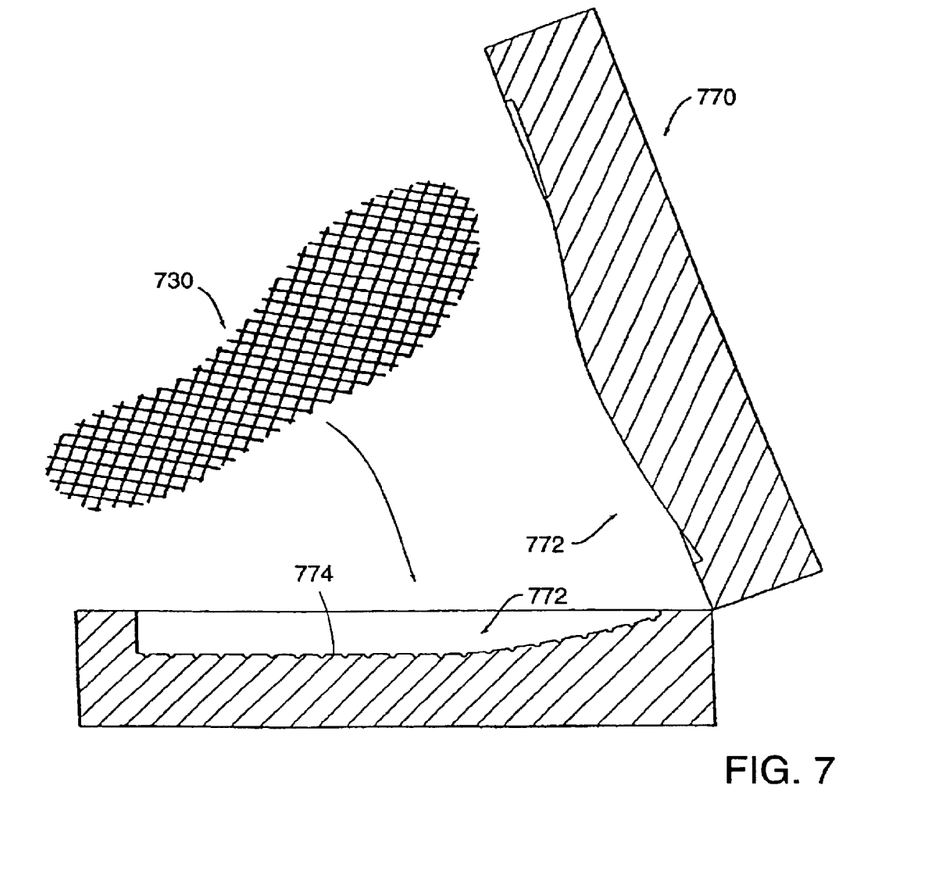
FIG. 7 is a schematic side view of a compression mold and mesh in accordance with the present invention.

FIG. 7 depicts an embodiment of a compression mold 770 and a mesh 730. The mold 770 generally includes an inner surface 772 that determines the shape of the sole layer to be formed, and structural features 774 such as depressions that are complementary to the geometry of the mesh 730. During the molding process, the mesh 730, that has been inserted into the complementary structural features 774, is partially embedded in the sole layer as the sole layer is formed in the mold, such that portions of the mesh 730 extend from the bottom surface of the sole layer as described above. The mesh 730 can be positioned and retained in the mold 770 to maintain its desired position during the molding step, for example, by aligning the mesh 730 within the complementary structures 774 or a registration device, such as registration pins.

The mold also can have additional structural features on the inner surface 772 to form profile ridges and/or grooves as described above. When forming a sole with both coterminous mesh and mesh that extends beyond the sole layer, the mold 770 might have complementary structures in some portions of the inner surface and not in others.

The method also can include the step of coating the portions of the mesh that are to extend from the sole layer with a removable film or release agent, so that these portions are selectively prevented from being embedded in the sole layer during the embedding step. This obviates the need for complementary structural features in the mold and allows the mold to be used in forming a variety of soles with different mesh configurations that are partially embedded in the sole layer. This step can also be used to coat only portions of the mesh so that the uncoated portion of the mesh is embedded in the sole layer, and the coated portion is only partially embedded in the sole layer. The method also can include the step of coating portions of the mesh that are to be embedded and/or partially embedded in the sole layer with a bonding agent such as an adhesive or crosslinking agent to improve bonding between the mesh and the sole layer. Use of a release agent would prevent bonding, as known by those skilled in the art.

After inserting the mesh 730 in the mold 770, a sole slug made of a preferred material of the sole layer is placed in the mold 770. Standard vulcanization methods then can be used to apply heat and force to the sole slug in mold 770 so that the sole material flows in the contours of the inner surface 772 of the mold 770 and bloats. The material of the sole layer also penetrates into the mesh 730 and subsequently cures. After conventional cooling and eventual post-vulcanizing corrections, a form stable, light sole according to the present invention is obtained.

Figure 8:
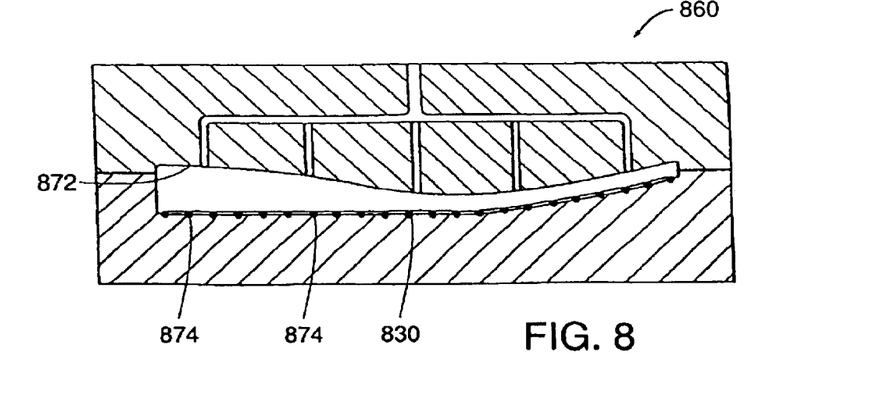
FIG. 8 is a schematic side view of a mesh and an injection mold in accordance with the present invention.

FIG. 8 depicts an exemplary embodiment of an injection mold 860 and a mesh 830. The injection mold 860 generally includes an inner surface 872 that determines the shape of the sole layer to be formed, and optional structural features 874 that are complementary to the geometry of the mesh 830. During the molding process, the mesh 830 that has been inserted into the complementary structural features 874 is partially embedded in the sole layer as the sole layer is formed in the mold, such that portions of the mesh 830 extend from the bottom surface of the sole layer, as described above. The mesh 830 can be mounted in the injection mold 860 to retain its desired position during the molding step, for example, by aligning it within the complementary structures 874 or with another type of registration device such as registration pins.

The mold 860 also can have structural features to form profile ridges and/or grooves as described above. When farming a sole with both coterminous mesh and mesh that extends beyond the sole layer, the mold 860 might have complementary structures in some portions of the inner surface and not in others.

The method also can include the step of coating the portions of the mesh that are to extend from the sole layer with a removable film or release agent, so that these portions are selectively prevented from being embedded in the sole layer during the embedding step. This obviates the need for complementary structural features and allows the injection mold to be used in forming a variety of soles with different mesh configurations that are partially embedded in the sole layer and/or substantially coterminous with the sole layer. The method also can include the step of coating portions of the mesh that are to be embedded in the sole layer with a bonding agent such as adhesive or crosslinker to improve bonding between the mesh and the sole layer. Use of a release agent would prevent bonding, as known by those skilled in the art.

After inserting the mesh 830 into the injection mold 872, the material of the sole layer is injected into the mold 872 and is vulcanized using conventional injection molding methods and techniques so that the sole material flows in the contours of the inner surface 872 of the mold 860 and bloats. The material of the sole layer also penetrates into the mesh 830 and subsequently cures. After conventional cooling and eventual post-vulcanizing corrections, a form stable, light sole according to the present invention is obtained.

Yet another aspect of the present invention is directed to a method for manufacturing an article of footwear. The method generally includes the steps of: providing a mold; inserting a mesh into the mold; forming a sole layer in the mold, the sole layer having a mesh layer at least partially embedded in the sole layer; and attaching an upper to the sole layer. This method is described above with respect to the method of manufacturing a sole for an article of footwear and includes the further step of attaching an upper to the sole layer. The upper can be attached to the sole by conventional means such as adhesive, stitching, and/or tacking.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A sole for an article of footwear, the sole comprising:
a first layer having a ground engaging surface; and
a second layer having a ground engaging surface, the second layer comprising a continuous mesh having a first side and a second side, the first side embedded in the first layer and the second side continuously exposed along the ground engaging surface of the first layer.

2. The sole of claim 1, wherein the seond layer comprises a contoured surface.

3. The sole of claim 1, wherein the second layer comprises a knit structure formed from thread.

4. The sole of claim 3, wherein the thread comprises a plurality of spun fibers.

5. The sole of claim 1, wherein the mesh comprises a material selected from the group consisting of metals, polyesters, polyamides, aramids, and combinations thereof.

6. The sole of claim 1, wherein at least a portion of the second layer extends beyond a bottom surface of the first layer.

7. The sole of claim 1, wherein the second layer is substantially coterminous with a bottom surface of the first layer.

8. The sole of claim 1, wherein the first layer comprises a profile groove defined by a bottom surface of the first layer.

9. The sole of claim 1, wherein the first layer comprises a damping material.

10. The sole of claim 9, wherein the damping material comprises a material selected from the group consisting of ethylene vinyl acetate, polyurethane, rubber, and combinations thereof.

11. The sole of claim 1, wherein the second layer extends along substantially an entire length of a bottom surface of the first layer.

12. The sole of claim 1, wherein the second layer extends along a front surface of the first layer.

13. The sole of claim 1, wherein the second layer extends along a side surface of the first layer.

14. The sole claim 1, wherein the continuous mesh is substantially planar.

15. An article of footwear comprising:

an upper;

a first layer attached to the upper, the first layer having a ground engaging surface; and a second layer having a ground engaging surface, the second layer comprising a continuous mesh having a first side and a second side, the first side embedded in the first layer and the second side continuously exposed along the ground engaging surface of the first layer.

16. The article of claim 15, wherein the second layer comprises a contoured surface.

17. The article of claim 15, wherein the second layer comprises a knit structure formed from thread.

18. The article of claim 17, wherein the thread comprises a plurality of spun fibers.

19. The article of claim 15, wherein the mesh comprises a material selected from the group consisting of metals, polyesters, polyamides, aramids, and combinations thereof.

20. The article of claim 15, wherein at least a portion of the second layer extends beyond a bottom surface of the first layer.

21. The article of claim 15, wherein the second layer is substantially coterminous with a bottom surface of the first layer.

22. The article of claim 15, wherein the first layer comprises a profile groove defined by a bottom surface of the first layer.

23. The article of claim 15, wherein the first layer comprises a damping material.

24. The article of claim 15, wherein the damping material comprises a material selected from the group consisting of ethylene vinyl acetate, polyurethane, rubber, and combinations thereof.

25. The article of claim 15, wherein the second layer extends along substantially an entire length of a bottom surface of the first layer.

26. The article of claim 15, wherein the second layer extends along a front surface of the first layer.

27. The article of claim 15, wherein the second layer extends along a side surface of the first layer.

28. The article of claim 15, wherein the continuous mesh is substantially planar.

* * * * *

UNITED STATES PATENT AND TRADEMARK OFFICE
CERTIFICATE OF CORRECTION

PATENT NO. : 6,782,642 B2
DATED : August 31, 2004
INVENTOR(S) : Knoche et al.

It is certified that error appears in the above-identified patent and that said Letters Patent is hereby corrected as shown below:

<u>Title page,</u>
Item [73], Assignee, "adidas International"should be deleted and replaced with
-- adidas International Marketing B.V. --.
Item [56], References Cited, OTHER PUBLICATIONS, the word "ASIC" should be deleted and replaced with the word -- ASICS® -- and the word "show" should be deleted and replaced with the word -- shoe --.

<u>Column 8,</u>
Line 56, the word "second" should be deleted and replaced with the word -- second --.

Signed and Sealed this

Nineteenth Day of April, 2005

JON W. DUDAS
*Director of the United States Patent and Trademark Office*